US009067373B2

(12) United States Patent
Milesi

(10) Patent No.: US 9,067,373 B2
(45) Date of Patent: Jun. 30, 2015

(54) PROCESS FOR THE MANUFACTURE OF FLEXIBLE PIPE

(75) Inventor: Daniel Milesi, Voiron (FR)

(73) Assignee: MULTI-BASE SA, St. Laurent du Pont (FR)

( * ) Notice: Subject to any disclaimer, the term of this patent is extended or adjusted under 35 U.S.C. 154(b) by 1207 days.

(21) Appl. No.: 12/992,735

(22) PCT Filed: May 14, 2009

(86) PCT No.: PCT/EP2009/055856
§ 371 (c)(1),
(2), (4) Date: Jun. 30, 2011

(87) PCT Pub. No.: WO2009/138470
PCT Pub. Date: Nov. 19, 2009

(65) Prior Publication Data
US 2011/0248424 A1    Oct. 13, 2011

(30) Foreign Application Priority Data

May 16, 2008   (FR) .................................... 08 53177

(51) Int. Cl.
| | | |
|---|---|---|
| B29D 23/00 | (2006.01) | |
| C08L 23/22 | (2006.01) | |
| C08J 3/24 | (2006.01) | |
| C08L 23/06 | (2006.01) | |
| C08L 23/10 | (2006.01) | |
| C08L 23/20 | (2006.01) | |
| C08K 5/00 | (2006.01) | |
| C08K 5/5419 | (2006.01) | |
| C08L 53/02 | (2006.01) | |
| C08L 83/04 | (2006.01) | |

(52) U.S. Cl.
CPC ............... *B29D 23/001* (2013.01); *C08L 23/22* (2013.01); *C08J 3/24* (2013.01); *C08J 2323/18* (2013.01); *C08K 5/0025* (2013.01); *C08K 5/5419* (2013.01); *C08L 23/06* (2013.01); *C08L 23/10* (2013.01); *C08L 23/20* (2013.01); *C08L 53/02* (2013.01); *C08L 83/04* (2013.01); *C08L 2205/22* (2013.01)

(58) Field of Classification Search
None
See application file for complete search history.

(56) References Cited

U.S. PATENT DOCUMENTS

| | | |
|---|---|---|
| 3,419,593 A | 12/1968 | Willing |
| 5,175,325 A | 12/1992 | Brown et al. |
| 6,013,715 A | 1/2000 | Gornowicz et al. |
| 6,479,580 B1 * | 11/2002 | Chorvath et al. ............. 524/588 |
| 2006/0258796 A1 | 11/2006 | Boogh et al. |

FOREIGN PATENT DOCUMENTS

| | | |
|---|---|---|
| EP | 1770112 A1 | 4/2007 |
| JP | 59-087113 A | 5/1984 |
| JP | 06-099510 A | 4/1994 |
| JP | 2002-505366 A | 2/2002 |
| JP | 2003-041076 A | 2/2003 |
| JP | 2006-077813 A | 3/2006 |
| WO | WO 0046291 A1 | 8/2000 |

OTHER PUBLICATIONS

English language abstract and machine-assisted English translation for JP 06-099510 extracted from the PAJ database on Oct. 18, 2013, 30 pages.
English language abstract for JP 59-087113 extracted from the PAJ database on Oct. 18, 2013, 4 pages.
English language abstract and machine-assisted English translation for JP 2002-505366 extracted from the espacenet.com and PAJ databases on Oct. 18, 2013, 151 pages.
English language abstract and machine-assisted English translation for JP 2003-041076 extracted from the PAJ database on Oct. 18, 2013, 34 pages.
English language abstract and machine-assisted English translation for JP 2006-077813 extracted from the PAJ database on Oct. 18, 2013, 21 pages.
International Search Report for Application No. PCT/EP2009/055856 dated Sep. 9, 2009, 3 pages.

* cited by examiner

*Primary Examiner* — Benjamin Schiffman
(74) *Attorney, Agent, or Firm* — Howard & Howard Attorneys PLLC

(57) ABSTRACT

A process for the manufacture of flexible pipe from a composition comprising: a polymeric part (a) consisting of a thermoplastic polymer obtained by homopolymerization or copolymerization of a monomer of butene-1, or a blend of a thermoplastic polymer obtained by homopolymerization or copolymerization of a monomer of butene-1 with one or more compatible thermoplastic polymers, a polydiorganosiloxane (b) having a minimum Williams plasticity of 30 determined by the ASTM 926 test method and an average of at least 2 alkenyl radicals per molecule, an organohydrido silicon compound (c) having an average per molecule of at least 2 silicon atoms bound directly to a hydrogen atom, a hydrosililation catalyst (d) which process comprises (i) the provision of a cured polydiorganosiloxane (B1) obtained by crosslinking of the compounds (b) and (c) in the presence of catalyst (d), (ii) causing the cured polydiorganosiloxane (B1) to be dispersed in the polymeric part (a) thus obtaining a thermoplastic elastomer and (iii) molding, for example by extrusion, the thermoplastic elastomer into a flexible pipe. The thermoplastic elastomer used and the resulting pipes comply with the requirements of standard KTW-270 (A) in relation to drinking water contamination.

11 Claims, No Drawings

PROCESS FOR THE MANUFACTURE OF FLEXIBLE PIPE

RELATED APPLICATIONS

This application claims priority to and all the advantages of International Patent Application No. PCT/EP2009/055856, filed on May 14, 2009, which claims priority to France Patent Application No. FR 08/53177, filed on May 16, 2008.

The present invention relates to the field of flexible water pipes in particular those made from thermoplastic elastomers. In particular the flexible pipes or pipelines may be used for conveyance of liquid, preferably water and particularly drinking water, mainly for its conveyance under pressure and when it is heated. More precisely, the object of the invention is the use of a thermoplastic elastomer for the manufacture of a flexible pipe for conveyance of drinking water or a fluid under pressure and a flexible pipe prepared from such thermoplastic elastomer.

Organic materials such as plastics and elastomers are playing an increasingly important part in the management of water conveyance. These products are particularly appreciated for their lightness, which makes them easier to handle, their suitability for thermoforming, which makes them easier to shape, and their ease of connection without welding.

In terms of hot water conveyance, the choice of organic materials is obviously more restricted than for cold water conveyance because materials selected have to withstand simultaneous high pressure and temperature stress. The organic materials most commonly used in this field are Polybutene-1 (ISO 15876), PE-X (ISO 15875), PE-RT (ISO 22391) and Polypropylene (ISO 15874).

However, although these materials have a degree of flexibility, they have proved to be unsuitable for the manufacture of flexible pipes or hoses such as those making connections between sanitary equipment and the drinking water distribution network. Therefore these hoses or pipes are generally in the form of flexible pipes of variable diameter and length comprising a rubber tube encased in metal braiding with connections at the ends. The rubber used is generally EPDM rubber, which represents a good cost/performance compromise.

Requirements exist for conveyance of drinking water in relation to non-contamination of the water by the component materials of the pipes or pipelines. In particular, if there is permanent or temporary contact with water intended for human consumption, the hose must not compromise the drinking water quality, in accordance with for example the Directives applicable in the European Community and the EFTA Regulations on drinking water quality in Europe. Unilateral European standards are not currently in existence for certification of drinking water piping networks, however. To correct this situation, the European Commission initiated a European Acceptance System (EAS) in June 2000 with the objective of harmonising the existing national certification procedures for testing of equipment and products in contact with water intended for human consumption, supported by the Joint Research Centre—European Commission. Contracts were placed with certification organisations responsible for drinking water quality in each Member State to conduct the necessary development studies within four working groups. Until the system enters into force, the national procedures for certification of drinking water systems continue to apply. In Europe the national drinking water management and certification organisations are as follows: for the Netherlands: KIWA N.V.; for France: the Centre de Recherche et de Contrôle des Eaux de Paris and the Laboratoire d'Hygiène et de Recherche en Santé Publique; for the United Kingdom: WRcpic; for Austria: OVGW—Österreichische Vereinigung für das Gas and Wasserfach; for Germany: DVGW—Technologiezentrum Wasser; for Denmark: Dansk Toksikologi Center; for Spain: Universitat Autónoma de Barcelona; for Italy: Istituto Superiore di Sanitá; for Sweden: SP Swedish National Testing and Research Institute and for Portugal: Empresa Portuguesa das Aguas Livres, SA.

Consequently manufacturers of equipment or pipelines for conveyance of drinking water must obtain licenses for the products manufactured and systems assembled from the national and international organisations responsible for water hygiene and quality. Ultimately, it can be expected that the most stringent national standards will be adopted at European level. Since 2008 the German organisation DVGW has made its KTW 270 standard more stringent by changing the requirement for conveyance of drinking water from class C to class A. This new requirement has excluded EPDM, which cannot meet the TOC (Total Organic Carbon) value required under class A due to its composition.

In line with this new regulation, manufacturers of hoses for the German market have been forced to switch to KTW-270 (A) certified materials, the choice of which is very limited. It is restricted to certain platinum cured silicone rubbers and some PEX-B and PEX-C. Some TPE such as Santoprene XF241-80EU are only KTW-270 (A) certified for conveyance of cold water. In addition to being few in number, these materials often have technical/economic characteristics which are very different from those of EPDM rubber. Silicone rubber is about 3 times more expensive than EPDM rubber per meter of hose. PEX are more rigid than EPDM and do not give flexible enough hoses above small diameters.

Therefore there is a real need for a material which is more pliable than PEX and enables hoses and flexible pipes and pipelines for conveyance of hot water to be produced, preferably at a price similar to that of EPDM.

The present invention therefore provides in a first aspect a process for making a flexible pipe from a composition comprising a thermoplastic elastomer, said thermoplastic elastomer needing to have flexibility and mechanical properties at high temperature and under pressure compatible with its use for the manufacture of pipes for conveyance of hot water or fluids under pressure. The thermoplastic elastomer must also comply with the requirements of standard KTW-270 (A) in relation to drinking water contamination.

A further objective of the invention is to supply flexible pipe made from such composition comprising the thermoplastic elastomer, which pipe can be economically produced industrially.

Against this background, the present invention provides a process for making a flexible pipe from a composition comprising:

a) a polymeric part (a) consisting of a thermoplastic polymer obtained by homopolymerisation or copolymerisation of a monomer of butene-1 or a blend of a thermoplastic polymer obtained by homopolymerisation or copolymerisation of a monomer of butene-1 with one or more compatible thermoplastic polymers, b) a polydiorganosiloxane (b) having a minimum Williams plasticity of 30 determined by the ASTM 926 test method and an average of at least 2 alkenyl radicals per molecule, c) an organohydrido silicon compound (c) having an average per molecule of at least 2 silicon atoms bound directly to a hydrogen atom, d) a hydrosililation catalyst (d)

which process comprises (i) the provision of a cured polydiorganosiloxane (B1) obtained by crosslinking of the compounds (b) and (c) in the presence of catalyst (d), (ii) causing the cured polydiorganosiloxane (B1) to be dispersed in the polymeric part (a) thus obtaining a thermoplastic elastomer and (iii) moulding, for example by extrusion, the thermoplastic elastomer into a flexible pipe.

A suitable thermoplastic elastomer material for use according to the invention has been to some extent described in the comparative examples of patent application WO 00/46291. Such thermoplastic elastomer is more pliable than PEX. In addition, when made into pipes or hoses, it can meet the most stringent requirements for conveyance of cold or hot drinking water, such as standard KTW-270 (A).

According to a particular embodiment of the invention, the process step of crosslinking of the compounds (b), (c) in the presence of (d) may occur by dynamic cure in the polymeric part (a) in the molten state.

The thermoplastic elastomer used in the process according to the invention may be obtained from a composition containing the polymeric part (a) by adding compounds (b), (c) and (d) pre-cured, or by directly mixing compounds (b), (c) and (d) with the polymeric part, then curing to obtain the cured polydiorganosiloxane.

According to another of its aspects, the present invention provides for flexible pipes which are made from the thermoplastic elastomer as described above.

According to another of its aspects, the present invention relates to the use of a composition as described above or of the thermoplastic elastomer resulting therefrom for the manufacture of a flexible pipe, particularly for conveyance of drinking water or a fluid under pressure.

A thermoplastic elastomer for use in the process of the invention, comprises:
A1) a polymeric matrix consisting (a) of a thermoplastic polymer obtained by polymerisation or copolymerisation of a monomer of butene-1, or a blend of a thermoplastic polymer obtained by homopolymerisation or copolymerisation of a monomer of butene-1 with one or more compatible thermoplastic polymers,
B1) a cured polydiorganosiloxane (B1) obtained by crosslinking of the following compounds (b) and (c):
   a polydiorganosiloxane (b) having a minimum Williams plasticity of 30 determined by test method ASTM 926 and an average of at least 2 alkenyl radicals per molecule,
   an organohydrido silicon compound (c) having an average per molecule of at least 2 silicon atoms bonded directly to a hydrogen atom,
   in the presence of a hydrosililation catalyst (d),
   the cured polydiorganosiloxane (B1) being dispersed in the polymeric matrix (a),
whereby the curing of compounds (b), (c) in the presence of (d) to form cured polydiorganosiloxane (B1) occurs by dynamic curing in the polymeric matrix (a) in the molten state.

According to a particular embodiment, dynamic curing is obtained in a co-rotating twin screw extruder.

The thermoplastic elastomer for use in a process according to the invention contains a polymeric matrix (a) in which the polydiorganosiloxane distribution is approximately homogeneous. Said polymer matrix consists of a thermoplastic polymer, mixed if necessary with one or more compatible thermoplastic polymers, at least one of the thermoplastic polymer constituents of the polymer matrix being a polymer of butene-1 and therefore obtained by homopolymerisation or copolymerisation of a monomer of butene-1.

"Compatible" polymers are understood to be two polymers having chemical compatibility (meaning that the main functional groups can easily be mixed) which gives a relatively homogeneous polymeric entity, particularly after fusion/hardening, that is without any exudation, separation or demixing phenomena.

The polymeric matrix used may be a homopolymer of polybutene-1 or a copolymer of polybutene-1 for example with ethylene which could have more satisfactory pliability and flexibility characteristics. PB0110M marketed by Basell may be cited to exemplify a homopolymer of polybutene-1. A homopolymer of this kind has pliability or flexibility determined by its flexural modulus which is 450 MPa measured according to standard ISO 178 at 23° C., and a melt point of 128° C. The pliability or flexibility of a copolymer of polybutene-1 increases as the comonomer ratio increases; conversely the melt point decreases with the comonomer ratio. For example, the flexural modulus is 250 MPa measured according to standard ISO 178 at 23° C. and the melt point is 114° C. for PB 8640M (Basell) and the flexural modulus is 140 MPa measured according to ISO 178 at 23° C. and the melt point is 97° C. for DP 8220M (Basell). Therefore a pliability limit for the copolymer used is imposed by the melt point, which rules out the most pliable copolymers for conveyance of hot water. The composition used in the process according to the invention achieves the pliability but does not compromise the temperature resistance necessary for the application. To be compatible with their use for conveyance of hot water, it is preferred that the polymers making up the polymeric matrix (a) have a melt point greater than or equal to 95° C., preferably greater than or equal to 110° C.

It is also possible to use a blend of a polymer of butene-1 with one or more compatible thermoplastic polymers. To improve the pliability and elasticity characteristics of the polymeric matrix further, it is possible for the polymeric part (a) to be a homopolymer or copolymer of polybutene-1 mixed with at least one thermoplastic elastomer with a maximum flexural modulus of 200 MPa measured according to standard ISO 178 at 23° C. or a maximum Shore A hardness of 40 Shore D according to standard ISO 868 at 23° C.

In particular, the polymeric part (a) may be a blend of a homopolymer or copolymer of polybutene-1 with an elastomer from the styrene block copolymer family. According to one embodiment, the elastomer from the styrene block copolymer family is hydrogenated and is preferably selected from the polymers SEEPS (for Styrene-Ethylene-Ethylene-Propylene-Styrene), SEPS (for Styrene-Ethylene-Propylene-Styrene) and SEBS (for Styrene-Ethylene-Butylene-Styrene). The SEEPS are exemplified by the Septon S4000 family from Kuraray, the SEPS by the Septon S2000 family from Kuraray or the Kraton G family from Kraton Polymers and the SEBS by the Septon S8000 family from Kuraray or the Kraton G family from Kraton Polymers. It is also possible for the polymeric part (a) to be a blend of a homopolymer or copolymer of polybutene-1 with an elastomer from the olefinic copolymer family and preferably with a propylene-based copolymer. These propylene-based copolymers are exemplified by the propylene and ethylene copolymers and propylene, ethylene and butene-1 terpolymers. Such olefinic polymers are specifically exemplified by those in the Hifax® (supplier Basell), Adflex® (supplier Basell), Softell® (supplier Basell), Vistamaxx® (supplier Exxon Chemical), and Versify® (supplier Dow Chemical) family.

In addition to the thermoplastic polymer of butene-1, it is possible to use a blend of the thermoplastic elastomer polymers previously cited, particularly an olefinic polymer mixed with a styrenic polymer.

Per 100 parts by weight of polymeric part (a), it is preferred to use:
- 40-100 parts by weight: polymer of polybutene-1, more preferably 40 to 80 parts,
- 0-60 parts by weight: one or more other compatible thermoplastic polymers, more preferably 20 to 60 parts.

If the polymer of polybutene-1 is a homopolymer of butene-1, it will generally represent a smaller weight percent of the polymeric part (a) than if the polymer of polybutene-1 is a copolymer of butene-1.

U.S. Pat. No. 6,013,715 in the name of Dow Corning discloses compositions consisting of a polyolefin or polyester based matrix in which a hydrosilylation cured polydiorganosiloxane is dispersed and the method of preparation of such compositions. However, none of the materials specifically described in that document are suitable for the manufacture of flexible hoses for conveyance of hot water or flexible hoses for conveyance of fluids under pressure, which require a pliable material which is creep resistant at temperatures up to 90° C. and has high resistance to pressure stress. None of the compositions described in U.S. Pat. No. 6,013,715 can simultaneously meet the requirements cited above.

U.S. Pat. No. 6,013,715 describes the curing of a polydiorganosiloxane to obtain a thermoplastic elastomer material with mechanical properties, particularly tensile stress behaviour, higher than the same composition with an uncured polydimethylsiloxane (PDMS). However, the matrix is described in a very general way in that patent and no mention is made of an application or article manufactured from said products. Nevertheless the document can be referred to in relation to the polydiorganosiloxane (b), the organohydrido silicon compound (c) and the hydrosililation catalyst used for the purposes of the present invention. The description given for these compounds in that patent is restated below:

Polydiorganosiloxane (b) is most often and preferably a gum type (i.e. having a high viscosity, typically a viscosity at 25° C. of 100,000 mPa·s or more) polymer or copolymer which contains at least 2 alkenyl radicals having generally 2 to 20 carbon atoms in its molecule. The alkenyl group is specifically exemplified by the vinyl, allyl, butenyl, pentenyl, hexenyl and decenyl groups. The position of the alkenyl functionality is not critical and it may be bonded at the molecular chain terminal units, in non-terminal positions on the molecular chain or at both positions. It is preferred that the alkenyl group is vinyl or hexenyl and that this group is present at a level of 0.001 to 3 weight percent, preferably 0.01 to 1 weight percent, in the polydiorganosiloxane gum. Most preferably 2 alkenyl groups are present on average per siloxane (b).

The remaining (i.e., non-alkenyl) silicon-bonded organic groups in component (b) are independently selected, for example, from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, of course, that these groups are selected such that the polydiorganosiloxane gum (b) has a glass transition temperature (or melt point), which is below room temperature and the gum is therefore elastomeric. The methyl group preferably makes up at least 85, more preferably at least 90, mole percent of the non-unsaturated silicon-bonded organic groups in component (b).

Thus, polydiorganosiloxane (b) can be a homopolymer, a copolymer or a terpolymer containing such organic groups. Examples of such polymers include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain structures, linear structures being preferred.

Specific illustrations of polydiorganosiloxane (b) include: trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked polydimethylsiloxanes; dimethylvinylsiloxy-endblocked dimethylsiloxane-methylvinylsiloxane copolymers; dimethylvinylsiloxy-endblocked polymethylphenylsiloxanes; dimethylvinylsiloxy-endblocked methylphenylsiloxane-dimethylsiloxane-methylvinylsiloxane copolymers; and similar copolymers wherein at least one end group is dimethylhydroxysiloxy. Preferred systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

Component (b) may also consist of combinations of two or more polyorganosiloxanes. Most preferably, component (b) is a polydimethylsiloxane homopolymer which is terminated with a vinyl group at each end of its molecule or is a homopolymer which also contains at least one vinyl group along its main chain.

For the purposes of the present invention, the molecular weight of the polydiorganosiloxane gum is sufficient to impart a Williams plasticity number of at least about 30 as determined by the American Society for Testing and Materials (ASTM) test method 926. The plasticity is defined for purposes of the invention as the thickness in millimeters×100 of a cylindrical test specimen 2 $cm^3$ in volume and approximately 10 mm in height after the specimen has been subjected to a compressive load of 49 Newtons for three minutes at 25° C. When the plasticity of this component is less than about 30, the compositions containing a blend of thermoplastic materials and siloxane materials prepared by dynamic vulcanisation exhibit poor uniformity such that at high silicone contents (e.g., 30 to 70 weight percent) there are regions of essentially only silicone and those of essentially only thermoplastic resin, and the blends are weak and friable. Although there is no absolute upper limit on the plasticity of component (b), practical considerations of processability in conventional mixing equipment generally restrict this value. Preferably, the plasticity number should be about 50 to 200, most preferably about 50 to 185.

Methods for preparing the polydiorganosiloxanes used according to the invention are well known to a person skilled in the art. For example, a typical method for preparing an alkenyl-functional polymer comprises the base-catalysed equilibration of cyclic and/or linear polydiorganosiloxanes in the presence of similar alkenyl-functional species.

The organohydrido silicon compound (c) is a crosslinker (cure agent) for polydiorganosiloxane (b) of present composition. It is generally an organopolysiloxane which contains at least 2 silicon-bonded hydrogen atoms in each molecule, but having at least about 0.2 weight percent hydrogen, preferably 0.2 to 2 and most preferably 0.5 to 1.7, percent hydrogen bonded to silicon. Those skilled in the art will, of course, appreciate that either component (b) or component (c), or both, must have a functionality greater than 2 if polydiorganosiloxane is to be cured (i.e., the sum of these functionalities must be greater than 4 on average). The position of the silicon-bonded hydrogen in component (c) is not critical, and it may be bonded at the molecular chain terminals, in non-terminal positions along the molecular chain or at both positions. The silicon-bonded organic groups of component (c) are independently selected from any of the hydrocarbon or halogenated hydrocarbon groups described above in connection with polydiorganosiloxane (b). The molecular structure of component (c) is also not critical and is exemplified by straight-chain, partially branched straight-chain, branched, cyclic and network structures, linear polymers or copolymers being preferred. Component (c) should obviously be compatible with polydiorganosiloxane (b) to allow curing.

Component (c) is exemplified by the following:
low molecular weight siloxanes, such as $PhSi(OSiMe_2H)_3$;
trimethylsiloxy-endblocked polymethylhydridopolysiloxanes;
trimethylsiloxy-endblocked dimethylsiloxane methyl-hydridosiloxane copolymers;
dimethylhydridosiloxy-endblocked polydimethylpolysiloxanes;
dimethylhydrogensiloxy-endblocked methylhydrogenpoly siloxanes;
dimethylhydridosiloxy-endblocked dimethylsiloxane methylhydridosiloxane copolymers;
cyclic methylhydrogenpolysiloxanes;
cyclic dimethylsiloxane-methylhydridosiloxane copolymers;
tetrakis(dimethylhydrogensiloxy)silane;
silicone resins composed of $(CH_3)_2HSiO_{1/2}$, $(CH_3)_3SiO_{1/2}$, and $SiO_{4/2}$ units; and
silicone resins composed of $(CH_3)_2HSiO_{1/2}$, $(CH_3)_3SiO_{1/2}$, $CH_3SiO_{3-2}$, $PhSiO_{3/2}$ and $SiO_{4/2}$ units,
wherein Me and Ph hereinafter denote methyl and phenyl radicals, respectively.

Particularly preferred organohydrido silicon compounds are polymers or copolymers with RHSiO units ended with either $R_3SiO_{1/2}$ or $HR_2SiO_{1/2}$, wherein R is independently selected from alkyl radicals having 1 to 20 carbon atoms, phenyl or trifluoropropyl, preferably methyl. It is also preferred that the viscosity of component (c) is about 0.5 to 1,000 mPa-s at 25° C., preferably 2 to 500 mPa-s when measured using a Brookfield® HB DV-II+PRO with a cone plate spindle at a speed of 5 rpm. Further, this component preferably has 0.5 to 1.7 weight percent hydrogen bonded to silicon. It is highly preferred that component (c) is selected from a polymer consisting essentially of methylhydridosiloxane units or a copolymer consisting essentially of dimethylsiloxane units and methylhydridosiloxane units, having 0.5 to 1.7 percent by weight hydrogen bonded to silicon and having a viscosity of 2 to 500 mPa-s at 25° C. when measured using a Brookfield® HB DV-II+PRO with a cone plate spindle at a speed of 5 rpm. Such a highly preferred system will preferably have terminal groups selected from trimethylsiloxy or dimethylhydridosiloxy groups.

Component (c) may also be a combination of two or more of the above described systems. The organohydrido silicon compound (c) is used at a level such that the molar ratio of SiH therein to Si-alkenyl in component (b) is greater than 1 and preferably below about 50, more preferably within the range 1 to 20, most preferably within the range 6 to 12.

These SiH-functional materials are well known in the art and many of them are commercially available.

It is also possible to interchange the alkenyl groups of component (b) and the hydrogen bonded silicon atoms of component (c). In other words, a person skilled in the art may use a higher molecular weight siloxane of the type described for component (b) which contains silicon atoms bonded to a hydrogen atom and no alkenyl group and a component (c) for curing which contains alkenyl groups and not silicon atoms bonded to a hydrogen atom.

Hydrosilation catalyst (d) is a catalyst which accelerates the curing reaction of polydiorganosiloxane (b) by reaction between the alkenyl groups and the silicon atoms bonded to a hydrogen atom. This hydrosilation catalyst may be preferably a platinum based catalyst, such as platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium based catalysts, such as rhodium chloride and rhodium chloride/di(n-butyl)sulphide complex and the like; and palladium based catalysts, such as palladium on carbon, palladium chloride and the like. Component (d) is preferably a platinum based catalyst such as chloroplatinic acid; platinum dichloride; platinum tetrachloride; a platinum based complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 issued to Willing; and a neutralized complex of platinous chloride and divinyltetramethyldisiloxane, prepared according to U.S. Pat. No. 5,175,325 issued to Brown et al., these patents being hereby incorporated by reference. Most preferably, catalyst (d) is a neutralized complex of platinous chloride and divinyltetramethyldisiloxane.

Component (d) is added to the present composition in a catalytic quantity sufficient to promote the reaction of components (b) and (c) and thereby cure the polydiorganosiloxane. For example, the catalyst is typically added so as to provide about 0.1 to 500 parts per million (ppm) of metal atoms based on the total weight of the thermoplastic elastomer composition, preferably 0.25 to 2550 ppm.

Use of the following is preferred for preparation of a thermoplastic polymer for use in a process according to the invention:
between 89 and 26, preferably between 70 and 40 weight percent of polymeric part (a) (consisting of a polymer of polybutene-1, mixed if necessary with one or more compatible thermoplastic polymers),
between 10 and 70, preferably between 15 and 45 percent by weight of polydiorganosiloxane (b),
between 0.3 and 3, preferably between 05 and 2 percent by weight of organohydrido silicon compound (c).

The relative proportions (b) and (c) depend on the vinyl molar ratio of (b) and the SiH molar ratio of (c) which is generally in the ratio 1:1 to 1:20, for preference in the ratio 1:6 to 1:12.

The catalyst is present in sufficient quantity to allow curing of compounds (b) and (c). If catalyst (d) is a platinum complex 0.015 to 0.15 percent by weight is preferably used and if it is platinum metal 0.000075 to 0.00075 percent by weight is preferably used. The weight percentages given above for components (a), (b), (c) and (d) are percentages by weight based on the total weight of the composition.

It is preferred that the composition for use in a process according to the invention includes independently:
as polydiorganosiloxane (b): a dimethylsiloxane copolymer, particularly a copolymer comprising dimethylsiloxane units and methylvinylsiloxane units as organohydrido silicon compound (c): a methylhydridosiloxane copolymer, particularly a copolymer containing dimethylsiloxane units and methylhydridosiloxane units as hydrosililation catalyst (d): a platinum catalyst.

The thermoplastic elastomer for use in a process according to the invention may also contain one or more additives such as photonic stabilizers, chemical stabilizers. In particular, each of these additives may be present at a level of 0.1 to 0.5 weight percent based on the total weight of the composition. Other potential additives include a reinforcing filler, particularly of the powdery filler type, which may be present in amounts of up to 200% by weight based on the amount of polydiorganosiloxane (b) used.

Photonic stabilizers are exemplified by highly sterically hindered amines, benzophenones and benzotriazoles, singly or mixed.

Chemical stabilizers are exemplified by phenolic and phosphite derivatives. In particular, each of these chemical or photonic stabilizers may be present at a level of 0.1 to 0.5 weight percent based on the total weight of the composition.

Compositions which contain a reinforcing filler have improved mechanical properties relative to those that do not employ the filler. This optional component may be any known filler selected generally from calcium carbonate, talc, kaolin, carbon black or any other filler known to reinforce polydiorganosiloxane (b) and is preferably selected from fine, heat stable minerals such as fumed and precipitated forms of silica, silica aerogels and titanium dioxide having a specific surface area of at least about 50 $m^2$/gram. The fumed form of silica is a preferred reinforcing filler based on its high surface area, which can be up to 450 $m^2$/gram and a fumed silica having a surface area of 50 to 400 $m^2$/g, most preferably 200 to 380 $m^2$/g, is highly preferred. When used, the filler is added at a level of up to about 200 parts by weight, preferably 5 to 150 and most preferably 20 to 100 parts by weight, for each 100 parts by weight of component (b).

For use in the process according to the present invention, the thermoplastic elastomer is preferably prepared by thoroughly dispersing polydiorganosiloxane (b) in the thermoplastic polymer(s) (a) and dynamically vulcanising the polydiorganosiloxane using organohydrido silicon compound (c) and catalyst (d). Mixing is carried out in any device which is capable of uniformly dispersing the components in the resin, such as an internal mixer or a twin-screw extruder, preferably a corotating twin-screw extruder, the latter being preferred for commercial preparations wherein the temperature is preferably kept as low as practical consistent with good mixing so as not to decompose the resin. The order of mixing is not critical and, for example, components (b) and (c) can be separately introduced and mixed with the thermoplastic resin before dynamic vulcanisation begins. However, components (b) and (c) should be well dispersed in thermoplastic (a) before catalyst (d) is added and dynamic vulcanisation begins. Optimum temperatures, mixing times and other conditions of the mixing operation depend upon the particular resin and other components under consideration and these may be determined by routine experimentation by those skilled in the art.

For the purposes of the present invention, it is possible to use a thermoplastic elastomer, which meets the certification requirements of standard KTW 270(A). Such thermoplastic elastomer has the desired flexibility properties and meets the mechanical pressure and temperature requirements for conveyance of hot water up to 90° C.

For the purposes of the present invention, it is therefore possible to use a thermoplastic elastomer which:
has a maximum flexural modulus of 200 MPa, measured on a specimen injected according to standard ISO 178 at 23° C.;
has a minimum compressive strength of 15 MPa measured on an H5A type specimen injected at 500 mm/mn according to standard ISO 527; and which
complies with the certification requirements in relation to standard DVGW W270 by measurement on injected plates according to standard W-270.

The process according to the invention comprises the step of using the thermoplastic elastomer in a moulding, particularly extrusion moulding process for the making of flexible pipes. Persons skilled in the art will be fully conversant with such extrusion processes, which are well known and documented in the art. Resulting flexible pipes may have dimensions commonly used for pipes for conveyance of fluids, especially water, such as particularly those having a wall thickness of between 1.5 mm and 5 mm and an inside diameter of between 6 mm and 32 mm. Flexible pipes made according to this process of the invention have been shown to be resistant to the following simultaneous temperature, time and pressure conditions:

93° C., 1 hour, 50 bar
93° C., 10 minutes, 90 bar.

Flexible pipes made according to this process of the invention have also been shown to be resistant to the pressure or temperature cycling tests specified by the certifying organisations, for example the LGA in Germany; and to comply with the certification requirements for flexible hoses obtained with the composition in relation to standard KTW-270 (A).

This thermoplastic elastomer material can therefore be used in the process according to the invention for making flexible pipes as a replacement for the traditional EPDM rubber. This is particularly important when certification under standard KTW-270 (A) is required. The thermoplastic elastomer identified above is distinguishable from other thermoplastic elastomers due to its excellent mechanical properties in high pressure and temperature conditions compatible with conveyance of hot water, whereas the use of other thermoplastics is limited to conveyance of cold water.

The process according to the invention includes the use of the thermoplastic elastomers obtained from such compositions described above in the manufacture of moulded (extruded) articles in the form of pipes. The thermoplastic elastomers are preferably provided in a form suitable for subsequent shaping by moulding, preferably in granular form. Therefore the process may comprise the additional step of making the thermoplastic elastomer into granules, for example a granular master batch. These granules may then be provided at the moulding/extrusion equipment, where they will be used to produce by moulding, preferably extrusion moulding, flexible pipes for conveyance of drinking water and in particular for routing of water in temperature conditions of up to 85° C.

The pipes according to the invention may be made by extrusion. The internal dimensions of the pipes may correspond to the standard dimensions used in water conduits. The physico-mechanical properties of any particular compound used are known and therefore once the operating pressures are known, it is easy to calculate the required thickness of pipe. It will be possible therefore to have a certain number of standard types and sizes of pipe as has been and still is the case with metal pipes.

It is envisaged that the pipes will be produced in suitable lengths which may be coiled to facilitate storage. The coils which are easily transportable to site can then be cut into pipe sections of the required length and any necessary joints, branches, bifurcate and trifurcate connections can be easily fitted.

Installation of the pipe according to the invention is greatly facilitated by the reduction in weight of the pipe and also by the flexibility of the pipe as compared with a comparable size of metal pipe. Lengths of the flexible pipe can be easily fed between narrow ducts or channels, in similar manner to electric cables, for example with the aid of conventional flexible metal leaders. It is also easy to embed the pipes in panels or cast sections and fit valves, cocks, flow meters etc and the necessary fittings to the ends of the pipes next to the consumption installations.

Furthermore the flexibility of the pipes gives the installation engineer a wider range of maneuverability and more space. Thus the manual bending of metal pipes, which is time consuming and sometimes results in the pipes kinking or breaking if the radii of curvature are too extreme, or the use of several connecting members to effect a connection where space is limited, for example when installing bath or shower units, is avoided by the use of the flexible pipe according to the invention which flexes automatically to accommodate any changes in direction and assumes the best configuration depending on the position and length of the pipe.

Additionally the flexibility of the pipes provides the opportunity for eliminating certain characteristic parts of sanitary fittings. The so called 'connections' i.e. the flexible copper pipes for water heaters can be replaced by a flexible pipe according to the invention of comparable size and the threaded wall fittings and fittings for the installation can easily be connected to the ends. The flexible pipe saves the cost of chromium plating which is always done on the connections, but if aesthetic demands were particularly strict the pipe may be coated with a suitable flexible metal covering, for example a braided covering.

The following examples illustrate the invention and are not limitative in nature. All percentages and parts are given by weight, unless otherwise indicated.

The formulations are used to manufacture granules, which are obtained by dynamic curing in a corotating twin-screw extruder. The granules are consolidated in a moulding operation, in the present case extrusion moulding, for manufacture of the tubes.

Production of the granules is as follows:
The polybutene and the compatible polymers forming component (a) are fed separately to the beginning of the extruder by means of a plurality of metering units or as a premix into a single metering unit. Components (b) and (c) are subsequently fed together or separately into the extruder. When the (a), (b) (c) blend is homogeneous, component (d) is introduced and mixing continues at a shearing rate which is suitable to cure component (b) and maintain its dispersion. The geometry of the extruder screws called the screw profile and the positions of the metering units are designed to obtain optimum mixing and curing of the composition. The four compositions below were extruded on a W&P extruder 25 mm in length, L/D=36. The temperature profile of the 9 plasticising cylinders is phased between 150° C. and 200° C. with one die at 200° C. The screw speed is 250 rpm and the flow rate 18 kg/h.

At the end of the extruder the product is extruded through a perforated die and a Gala type cutting system immersed in water produces and cools the granules. The process ends with centrifugation to separate the water from the granules and then a pass over a fluidised bed to dry the granules. The granules are then packed in bags.

Manufacture of Tubes:

The granules are introduced into the feed system of a single-screw extruder with an optimum compression ratio of between 2 and 3. The extruder ends in a tubular die known to those skilled in the art. On leaving the die the tube is calibrated and cooled in a cooling tank. At the end of the cooling line the tubes are wound onto reels.

EXAMPLE EX1

39% Polybutene-1 PB-110M from Basell
12% Olefinic elastomer HIFAX CA 7320 A from Basell
23% SEEPS Septon 4033 from Kuraray
25% Vinyl silicone SGM-11 from Dow Corning
0.95% crosslinker 7678 from Dow Corning
0.05% platinum catalyst 4000 from Dow Corning

EXAMPLE EX2

39% Polybutene-1 PB-8640M from Basell
12% Olefinic elastomer HIFAX CA 7320 A from Basell
23% SEEPS Septon 4033 from Kuraray
25% Vinyl silicone SGM-11 from Dow Corning
0.95% crosslinker 7678 from Dow Corning
0.05% platinum catalyst 4000 from Dow Corning

COMPARATIVE EXAMPLE EXA

44% Polypropylene HIFAX CA 7320 A from Basell
21% SEEPS Septon 4033 from Kuraray
25% Vinyl silicone HS-71 from Dow Corning
0.95% crosslinker 7678 from Dow Corning
0.05% platinum catalyst 4000 from Dow Corning

COMPARATIVE EXAMPLE CALLED EXB

44% HDPE Eradene ML74 from Polimeri
21% SEEPS Septon 4033 from Kuraray
34% Vinyl silicone HS-71 from Dow Corning
0.95% crosslinker 7678 from Dow Corning
0.05% platinum catalyst 4000 from Dow Corning The four compositions called Ex1, Ex2, ExA, ExB were extruded in granular form under the conditions described above. The granules were then consolidated to produce flexible tubes with an inside diameter of 8 mm. These tubes were used to manufacture lengths of flexible sanitary piping which were tested according to standard DVGW W543. The results are shown in TABLE 1.

TABLE 1

| Product reference | | | | Ex 1 | Ex 2 | Ex A | Ex B |
|---|---|---|---|---|---|---|---|
| Matrix | | | | PB-1 | PB-1 | PP | HDPE |
| Tube reference | | | | ND08 | ND08 | ND08 | ND08 |
| Inside diameter (mm) | | | | 8 | 8 | 8 | 8 |
| Wall thickness (mm) | | | | 1.5 | 1.5 | 1.5 | 1.5 |
| Pressure resistance | Duration | Pressure bar | Temp. °C. | | | | |
| | 168 h | 12 | 93 | OK | OK | OK | OK |
| | 1 min | 31.5 | 93 | OK | OK | OK | OK |
| | 1 h | 50 | 93 | OK | OK | NO | NO |
| | 10 min | 90 | 90 | OK | NO | NO | NO |
| Time resistance | No. of cycles | Pressure bar | Temp. °C. | | | | |
| | 25,000 | 10-20 | 93 | OK | OK | NO | NO |
| | 40,000 | 10-20 | 93 | OK | OK | NO | NO |
| Pressure pulse resistance | No. of cycles | Pressure bar | Temp. °C. | | | | |
| | 200 | 5-50 | 93 | OK | OK | NO | NO |
| | 400 | 5-50 | 93 | OK | OK | NO | NO |

The tests are carried out according to standard DVGW W543 "Pressure resistant flexible hose assemblies for drinking water supply systems; requirements and testing".

The invention claimed is:

1. A process for the manufacture of a flexible pipe from a composition comprising:
   a polymeric part (a) comprising:
      a blend of a thermoplastic polymer obtained by homopolymerisation or copolymerisation of a monomer of butene-1 with one or more compatible thermoplastic polymers, wherein the one or more compatible thermoplastic polymers comprises a blend of a homopolymer or copolymer of polybutene-1 with an elastomer from the styrene block copolymer family or comprises a blend of homopolymer or copolymer of polybutene-1 with an olefinic polymer mixed with a styrenic polymer,
   a polydiorganosiloxane (b) having a minimum Williams plasticity of 30 determined by the ASTM 926 test method and an average of at least 2 alkenyl radicals per molecule,
   an organohydrido silicon compound (c) having an average per molecule of at least 2 silicon atoms bound directly to a hydrogen atom,
   a hydrosilylation catalyst (d)
   which process comprises (i) the provision of a cured polydiorganosiloxane (B1) obtained by crosslinking of the compounds (b) and (c) in the presence of catalyst (d), (ii) causing the cured polydiorganosiloxane (B1) to be dispersed in the polymeric part (a) thus obtaining a thermoplastic elastomer complying with the requirement of standard KTW-270(A) in relation to drinking water contamination, and (iii) moulding the thermoplastic elastomer into the flexible pipe.

2. A process according to claim 1 characterised in that the polymeric part (a) is a homopolymer or copolymer of polybutene-1 mixed with at least one thermoplastic elastomer having a maximum flexural modulus of 200 MPa measured according to standard ISO 178 at 23° C. or a maximum Shore A hardness of 40 Shore D measured according to standard ISO 868 at 23° C.

3. A process according to claim 1 characterised in that the elastomer from the styrene block copolymer family is hydrogenated and is selected from the polymers: SEEPS (Styrene-Ethylene-Ethylene-Propylene-Styrene); SEPS (Styrene-Ethylene-Propylene-Styrene); and SEBS (Styrene-Ethylene-Butylene-Styrene).

4. A process according to claim 1 characterised in that the polymeric part (a) is a mixture of 40 to 100% by weight of a homopolymer or co-polymer of polybutene-1, and 0 to 60% of one or more compatible thermoplastic polymers.

5. A process according to claim 1 characterised in that the polydiorganosiloxane is a polydimethylsiloxane.

6. A process according to claim 1 characterised in that the organohydrido silicon compound (c) is a methylhydridosiloxane copolymer.

7. A process according to claim 1 characterised in that the hydrosilylation catalyst (d) is a platinum catalyst.

8. A process according to claim 1 characterised in that the polydiorganosiloxane is a copolymer comprising dimethylsiloxane units and methylvinylsiloxane units.

9. A process according to claim 1 characterised in that the organohydrido silicon compound (c) is a copolymer comprising dimethylsiloxane units and methylhydridosiloxane units.

10. A process according to claim 1 wherein the thermoplastic elastomer comprises:
   A1) a polymeric matrix (a) comprising:
      a blend of a thermoplastic polymer obtained by homopolymerisation or copolymerisation of a monomer of butene-1 with one or more compatible thermoplastic polymers, wherein the one or more compatible thermoplastic polymers comprises a blend of a homopolymer or copolymer of polybutene-1 with an elastomer from the styrene block copolymer family or comprises a blend of homopolymer or copolymer of polybutene-1 with an olefinic polymer mixed with a styrenic polymer,
   B1) a cured polydiorganosiloxane (B1) obtained by curing of the following compounds (b) and (c):
      a polydiorganosiloxane (b) having a minimum Williams plasticity of 30 determined by test method ASTM 926 and having an average of at least 2 alkenyl radicals per molecule,
      an organohydrido silicon compound (c) having an average per molecule of at least 2 silicon atoms bonded directly to a hydrogen atom,
   in the presence of a hydrosilylation catalyst (d),
   the cured polydiorganosiloxane (B1) being dispersed in the polymeric matrix (a), whereby the curing of compounds (b), (c) in the presence of (d) to form cured polydiorganosiloxane (B1) occurs by dynamic curing in the polymeric matrix (a) in the molten state.

11. A process according to claim 10, wherein the dynamic curing occurs in a co-rotating twin screw extruder.

* * * * *